(12) United States Patent
Zeng (10) Patent No.: US 11,632,183 B2
(45) Date of Patent: Apr. 18, 2023

(54) INTERACTIVE DEVICE FOR INTERNET RADIO STATION

(71) Applicant: Shenzhen Airsmart Technology Co., Ltd, Guangdong (CN)

(72) Inventor: Dejun Zeng, Guangdong (CN)

(73) Assignee: Shenzhen Airsmart Technology Co., Ltd, Shenzhen (CN)

( * ) Notice: Subject to any disclaimer, the term of this patent is extended or adjusted under 35 U.S.C. 154(b) by 425 days.

(21) Appl. No.: 16/978,698

(22) PCT Filed: May 18, 2018

(86) PCT No.: PCT/CN2018/087429
§ 371 (c)(1),
(2) Date: Sep. 6, 2020

(87) PCT Pub. No.: WO2019/218333
PCT Pub. Date: Nov. 21, 2019

(65) Prior Publication Data
US 2021/0099244 A1    Apr. 1, 2021

(51) Int. Cl.
*H04H 60/82*    (2008.01)
*G06F 3/16*    (2006.01)
(Continued)

(52) U.S. Cl.
CPC ............. *H04H 60/82* (2013.01); *G06F 3/165* (2013.01); *H01Q 1/44* (2013.01); *H04B 1/08* (2013.01);
(Continued)

(58) Field of Classification Search
CPC ........ H04H 60/82; H04H 20/82; H04H 40/18; G06F 3/165; H01Q 1/44; H04B 1/08; H04B 1/1607
See application file for complete search history.

(56) References Cited

U.S. PATENT DOCUMENTS 6,389,463 B2 * 5/2002 Bolas ........................ H04L 9/40
709/227

FOREIGN PATENT DOCUMENTS

CN    106330369 A    1/2017

OTHER PUBLICATIONS

International Search Report of PCT Patent Application No. PCT/CN2018/087429 dated Feb. 14, 2019.

* cited by examiner

*Primary Examiner* — Ankur Jain (57) ABSTRACT

Disclosed is an interactive device for an internet radio station, comprising a content presentation unit and a content selection unit. The content selection unit includes a knob, a selection module, a processing module, an indication module and a communication module. The knob inputs by a user, a channel selection instruction by means of manual rotation; the selection module generates a corresponding electrical signal according to the channel selection instruction; the processing module obtains, according to the electrical signal, a corresponding audio resource from the network radio station and releases the audio resource to the content presentation unit which plays the audio resource. The indication module generates, under the driving of the knob, a state change corresponding to the channel selection instruction. In this way, the user can select the audio resource by rotating the knob, so that the channel selection manner is similar to the traditional radio rotary tuning method.

18 Claims, 5 Drawing Sheets

(51) Int. Cl.
*H01Q 1/44* (2006.01)
*H04B 1/08* (2006.01)
*H04B 1/16* (2006.01)
*H04H 20/82* (2008.01)
*H04H 40/18* (2008.01)
(52) U.S. Cl.
CPC ........... *H04B 1/1607* (2013.01); *H04H 20/82* (2013.01); *H04H 40/18* (2013.01)

INTERACTIVE DEVICE FOR INTERNET RADIO STATION

TECHNICAL FIELD

The present disclosure relates generally to an electronic communication technical field, and more particularly relates to an interactive device for an internet radio station.

BACKGROUND

It has been more than 100 years since the birth of the traditional radio which has brought great impact on human life, especially in the era when television and internet have not appeared, it is the best tool for people to obtain information and enjoy entertainment programs. However, due to the limited transmission distance and poor sound quality (except FM), the traditional radio is gradually marginalized due to the influence of the region and listening environment in additional to the less and less content. With the rapid development of various electronic technologies and the internet, we have entered the network era. At present, there are many network radio stations on the network. These network radio stations can provide real-time music or broadcast voice programs, or provide the recording and playback of the music and broadcast, which brings great convenience to people. These radio stations are generally listened through the network radio or computer with screen or key indication from the internet. However, as these usage interaction manners are not as convenient as that of the traditional radio, so many users report that the use experience is not good. In addition, the traditional computer is relatively large, and subject to the network circuit, people usually can only listen at home, or use a laptop to listen, but it is still more troublesome. Moreover, because the computers and mobile phones are not radios themselves, there are little radio core components such as high-quality audio processing components, power amplifiers, which can provide good user experience and high-quality audio effect.

We think that both traditional radio and internet radio are tools for people to connect with sound content. Because the internet radio has more content and wider crowd adaptability, the network radio has gradually become an ideal entertainment tool for young people to accompany their voice and emotion.

SUMMARY

The present disclosure has provided an interactive device for an internet radio station whose channel can be changed by simply rotating the knob, similar to the traditional radio, aiming at the technical problem of the complicated listening mode of the current internet radio station, so that the user who is used to the traditional radio tuning manner will not have adaption difficulty when using the interactive device for an internet radio station provided by the present application and can accept and freely use the interactive device for an internet radio station of the present application to select the audio resources.

According to an aspect, an interactive device for an internet radio station is provided, which comprising a content presentation unit and a content selection unit, wherein the content selection unit comprises a knob, a selection module physically connected with the knob, a processing module electrically connected with the selection module, an indication module of a physical shape physically connected with the knob, and a communication module electrically connected with the processing module; wherein, the knob is configured to input, by a user, a channel selection instruction by means of manual rotation; the selection module is configured to generate a corresponding electrical signal according to the channel selection instruction; the processing module is linked to a network radio station by the communication module, and configured to obtain, according to the electrical signal, a corresponding audio resource from the network radio station and release the corresponding audio resource to the content presentation unit; the content presentation unit is configured to play the audio resource; and the indication module is configured to generate, under a driving of the knob, a state change corresponding to the channel selection instruction.

Advantageously, the selection module comprises a rotary potentiometer, wherein the knob is directly sheathed on a rotary shaft of the rotary potentiometer; wherein when the knob is rotated by the user to input the channel selection instruction, the rotary shaft of the rotary potentiometer is configured to generate the electrical signal corresponding to the channel selection instruction with the rotation of the knob.

Advantageously, the indication module comprises a dial around the knob and a pointer connected to the knob; wherein when the knob is rotated by the user to input the channel selection instruction, the pointer is configured to rotate along the dial with the knob.

Advantageously, the selection module comprises a rotary potentiometer, wherein the knob is physically connected with a rotary shaft of the rotary potentiometer through a contact module; wherein when the knob is rotated by the user to input the channel selection instruction, the knob is configured to bring the rotary shaft of the rotary potentiometer to rotate through the contact module, such that the rotary potentiometer is configured to generate the electrical signal corresponding to the channel selection instruction.

Advantageously, the indication module comprises a pull wire, a pointer connected with the pull wire, and a dial arranged along the pull wire; wherein the dial comprises a plurality of scale values corresponding to a plurality of different audio resources one by one, the contact module comprises a first pull wire wheel connecting with the rotary shaft of the rotary potentiometer, wherein the first pull wire wheel and the knob are winded by the pull wire, respectively; wherein when the knob is rotated by the user to input the channel selection instruction, the knob is configured to drive the pull wire to walk a certain track, so that the first pull wire wheel is configured to bring the rotary shaft of the rotary potentiometer to rotate correspondingly for generating the electrical signal corresponding to the channel selection instruction; wherein the processing module is configured to obtain, according to the electrical signal, a corresponding audio resource from the network radio station and release the corresponding audio resource to the content presentation unit; the content presentation unit is configured to play the audio resource; the pointer is configured to move along the dial with the pull wire and align with the scale value corresponding to the audio resource.

Advantageously, the indication module comprises a pull wire, a pointer connected with the pull wire, and a dial arranged along the pull wire; wherein the dial comprises a plurality of scale values corresponding to a plurality of different audio resources one by one, the contact module comprises a second pull wire wheel connecting with the rotary shaft of the rotary potentiometer, a first passive transmission wheel and a second passive transmission wheel; wherein the second pull wire wheel, the first passive transmission wheel, the second passive transmission wheel and the knob are winded by the pull wire simultaneously; wherein when the knob is rotated by the user to input the channel selection instruction, the knob is configured to drive the pull wire to walk a certain track, so that the second pull wire wheel is configured to bring the rotary shaft of the rotary potentiometer to rotate correspondingly for generating the electrical signal corresponding to the channel selection instruction; wherein the processing module is configured to obtain, according to the electrical signal, a corresponding audio resource from the network radio station and release the corresponding audio resource to the content presentation unit; the content presentation unit is configured to play the audio resource; the pointer is configured to move along the dial with the pull wire and align with the scale value corresponding to the audio resource.

Advantageously, the indication module further comprises a light-emitting element connected with the processing module, wherein the light-emitting element is arranged correspondingly to the dial for illuminating the dial.

Advantageously, the interactive device for an internet radio station further comprises a shell and an electronic circuit board arranged in the shell, the processing module and the communication module are integrated on the electronic circuit board, and the rotary potentiometer is welded on the electronic circuit board.

Advantageously, the light-emitting element is welded on the electronic circuit board.

The implementation of the interactive device for an internet radio station provided by the present application can achieve the following beneficial effects. The interactive device for an internet radio station comprises a content presentation unit and a content selection unit, wherein the content selection unit comprises a knob, a selection module physically connected with the knob, a processing module electrically connected with the selection module, an indication module in a physical form physically connected with the knob, and a communication module electrically connected with the processing module; wherein, the knob is configured to input, by a user, a channel selection instruction by means of manual rotation; the selection module is configured to generate a corresponding electrical signal according to the channel selection instruction; the processing module is linked to a network radio station by the communication module, and configured to obtain, according to the electrical signal, a corresponding audio resource from the network radio station and release the corresponding audio resource to the content presentation unit; the content presentation unit is configured to play the audio resource; and the indication module is configured to generate, under a driving of the knob, a state change corresponding to the channel selection instruction. In such a way, the user can select audio resources by rotating the knob. This operation manner is similar to the rotary tuning manner of the traditional radio, so that the user who is used to the traditional radio tuning manner will not have adaption difficulty when using the interactive device for an internet radio station provided by the present application and can accept and freely use the interactive device for an internet radio station of the present application to select the audio resources.

DETAILED DESCRIPTION OF THE PREFERRED EMBODIMENT

To make the object, the technical solution, and the advantage of the present application more clearly, the present application is further described in detail below with reference to the accompanying embodiments. It should be understood that the specific embodiments described herein are just a part of rather than all the embodiments of the present application. All other embodiments obtained by one skilled in the art without inventive works based on the embodiment of the present application, fall into the protection scope of the present application.

Embodiment 1

The interactive device for an internet radio station provided by the present embodiment comprises a shell, a content presentation unit and a content selection unit.

The content presentation unit may be one or more loudspeakers mounted on the shell and exposed to the outside.

Figure 1:
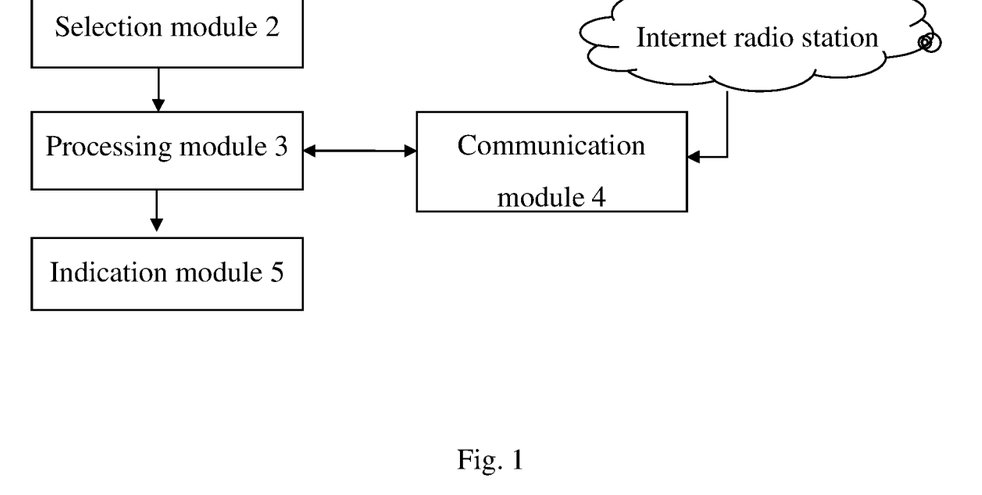
FIG. 1 is a block schematic diagram of the content selection unit according to the first embodiment of the present application.
Figure 2:
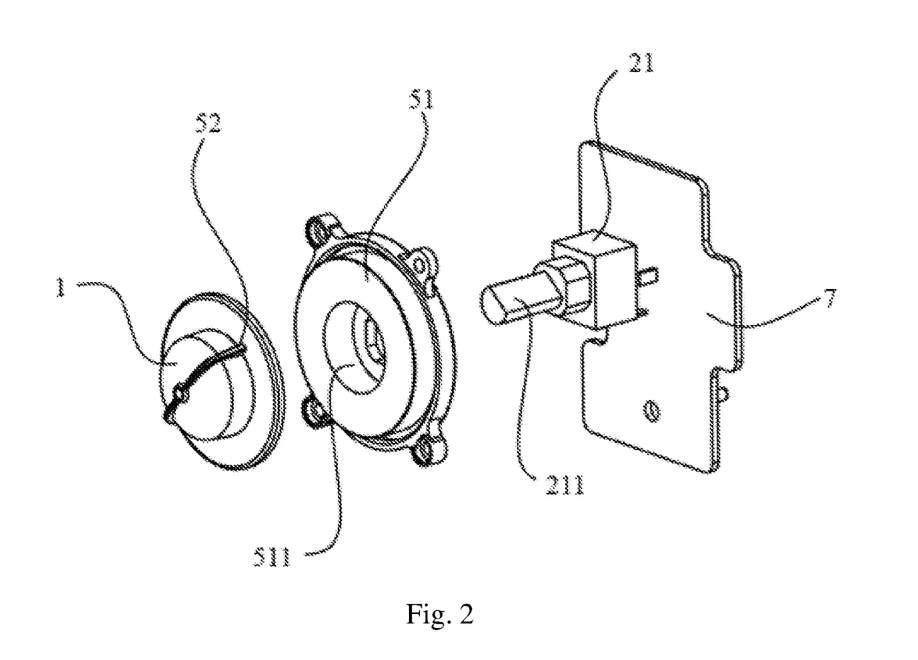
FIG. 2 is a stereoscopic decomposition diagram of the content selection unit according to the first embodiment of the present application.

As shown in FIG. 1 and FIG. 2, the content selection unit comprises a knob 1, a selection module 2 physically connected with the knob 1, a processing module 3 electrically connected with the selection module 2, an indication module 5 of a physical shape physically connected with the knob 1, and a communication module 4 electrically connected with the processing module 3. The processing module 3 is connected to the network radio station through the communication module 4.

Figure 3:
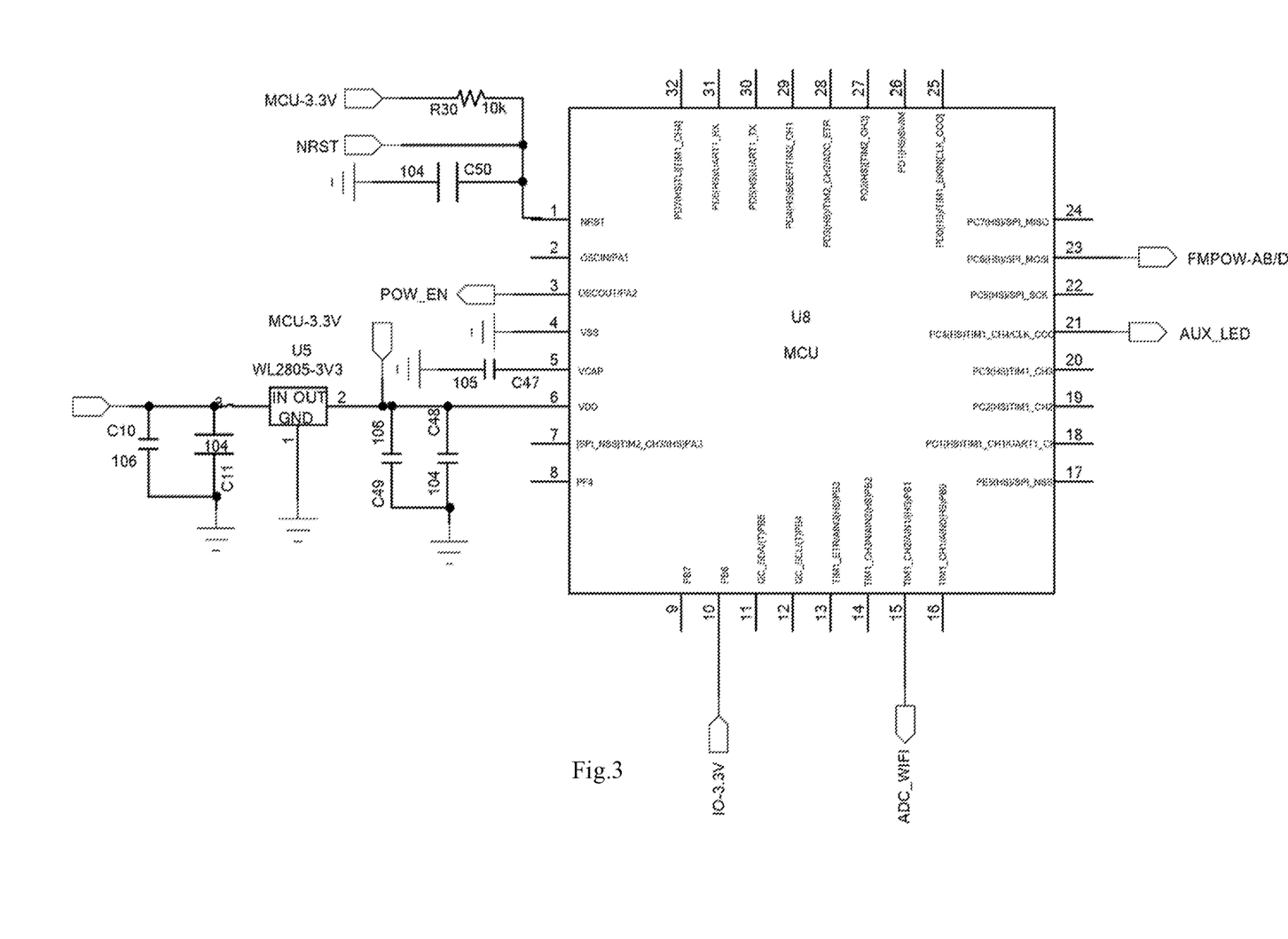
FIG. 3 is a circuit structure diagram of the processing module according to the first embodiment of the present application.

An electronic circuit board 7 (referring FIG. 2) is fixed inside the shell. The processing module 3 and the communication module 4 are integrated on the electronic circuit board 7. The circuit structure of the processing module 3 is shown in FIG. 3. The communication module 4 adopts the Wi-Fi chips.

Figure 4:
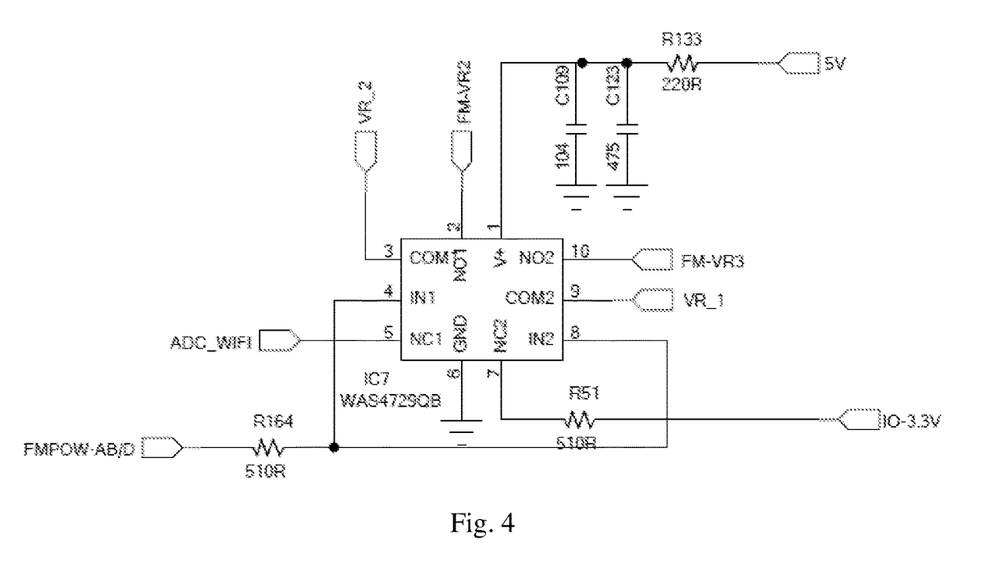
FIG. 4 is the circuit structure diagram of the function conversion circuit according to the first embodiment of the present application.
Figure 5:
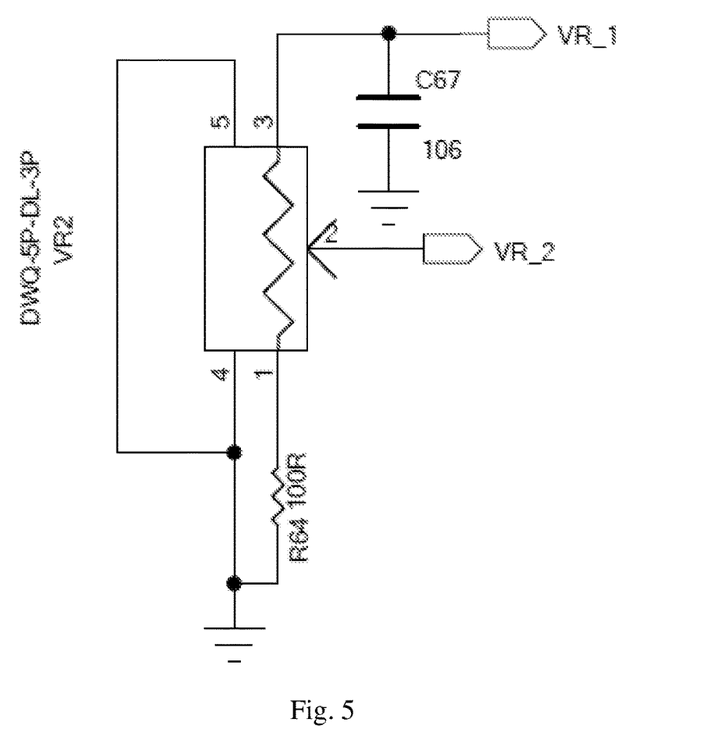
FIG. 5 is a circuit structure diagram of the channel selection circuit according to the first embodiment of the present application.

Referring to FIG. 2, the selection module 2 adopts a rotary potentiometer 21, and the knob 1 is directly sheathed and fixed on the rotary shaft 211 of the rotary potentiometer 21. When the knob 1 rotates, the rotation shaft 211 will rotate for the same angle. The rotary potentiometer 21 is connected to the electronic circuit board 7 and is provided with a channel selection circuit whose circuit structure is shown in FIG. 5. The channel selection circuit can convert the angular displacement of the rotary shaft 211 into corresponding electrical signals. In this embodiment, the channel selection circuit is connected to the processing module 3 through a function conversion circuit whose circuit structure diagram is shown in FIG. 4.

Figure 6:
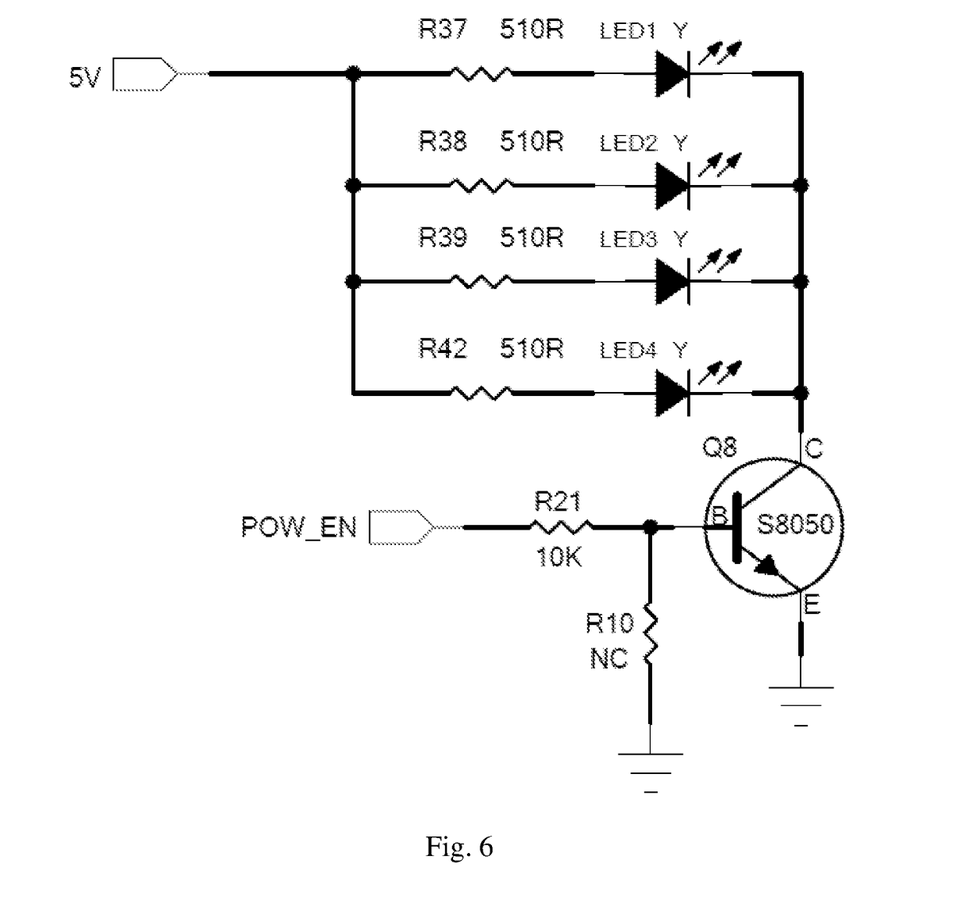
FIG. 6 is a circuit connection diagram between the LED lamp in the indication module and the processing module according to the first embodiment of the present application.

Referring to FIG. 2, the indication module 5 includes a dial 51, a pointer 52 and an LED lamp. The dial 51 is fixed on the outer side of the shell by screws and is located on the inner side of the pointer 52. A through hole 511 is arranged in the center of the dial 51 for the rotation shaft 211 of the rotary potentiometer 21 to pass through. The scale value is depicted on the dial 51. In this embodiment, a plurality of scale values in the form of Arabic numeral are on the dial 51. The plurality of scale values include "1", "2", "3", "4", "5", "6", "7", "8", "9" and "10". The dial surrounds the through hole 511, and the pointer 52 is fixed to the knob 1. When the knob 1 rotates, the pointer 52 rotates with the knob 1 along the dial. Referring to FIG. 6, the four LED lamps are connected with the processing module 3, and welded on the electronic circuit board 7 at a position aligned with the dial 51 to illuminate the dial 51. The four LED lamps are LED1, LED2, LED3 and LED4.

When the user manually rotates the knob 1 for a certain angle, the knob 1 brings the rotary shaft 211 of the rotary potentiometer 21 to rotate the same angle, so that the channel selection circuit in the rotary potentiometer 21 converts the angular displacement of the rotary shaft 211 into corresponding electrical signals. The processing module 3 is linked to the network radio station through the communication module 4 in advance. When the processing module 3 receives the electrical signal, it obtains the audio resource corresponding to the electrical signal from the network radio station, and sends the audio resource to the content presentation unit. The content presentation unit receives and plays the audio resource. In such a way, the desired audio resource can be selected and listened by using the rotary tuning manner of the analog traditional radio. Meanwhile, the processing module 3 also drives the LED lamp to light up, then the lighted LED lamp can illuminate the dial to make the dial more obvious and easier to be observed by the user.

On the other hand, when the knob 1 is rotated for a certain angle, the pointer 52 of the indication module 5 will rotate for a certain angle. At this time, the pointer 52 is aligned with a certain scale value of the dial, so that the user can clearly know what kind of audio resources can be listened when the pointer 52 is aligned with the certain scale value on the dial. When the user wants to listen to the same audio resource next time, the user only needs to rotate the knob 1 so that the pointer 52 is aligned with the corresponding scale value. For example, when the pointer 52 is aligned with the scale value labeled "7" on the dial, the content presentation unit plays the audio resources of the international relations class. Then, the next time when a user wants to listen to the audio resources of the international relations class, he only needs to turn the knob 1 to enable the pointer 52 to align with the scale value labeled "7" on the dial.

In conclusion, the implementation of the interactive device for the internet radio station provided by the present application can achieve at least the following beneficial effects.

1. When the interactive device for an internet radio station is used to listen to the network radio station, we can select the desired audio resources by rotating the knob 1. This selection manner is similar to the rotary tuning manner of the traditional radio, so that the user who is used to the traditional radio tuning manner will not have adaption difficulty when using the interactive device for an internet radio station provided by the present application and can accept and freely use the interactive device for an internet radio station of the present application to select the audio resources.

2. During the listening of the network radio station by the interactive device for an internet radio station, when the user have listened to the radio resource from a certain network radio station, the pointer 52 aligns with a certain scale value on the dial. In such way, it will be convenient for the user to select the desired audio resource, thus saving the troublesome search.

3. The indication module 5 further comprises the LED lamp, and the processing module 3 also drives the LED lamp to light up, then the lighted LED lamp can illuminate the dial to make the dial more obvious and easier to be observed by the user.

Figure 7:
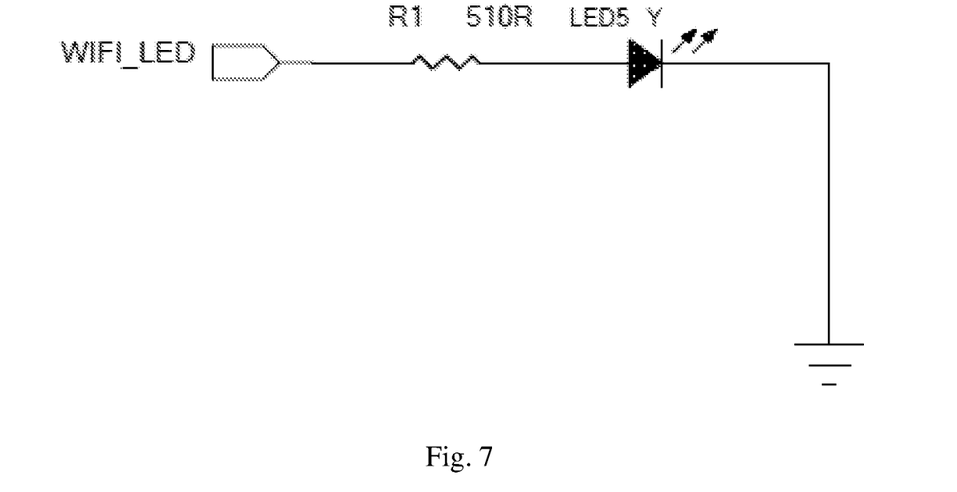
FIG. 7 is a circuit structure diagram of the network radio station indication circuit according to the first embodiment of the present application.

Further, the electronic circuit board is also integrated with a network radio station indication circuit electrically connected with the processing module 3 (referring FIG. 7). The network radio station indication circuit includes a network radio station indication LED 5 which is exposed from the shell. When the processing module 3 is successfully connected to the network radio station through the communication module 4, the network radio station indication LED 5 is turned on for a long time, while the network radio station indication LED 5 flashes during the connection process. In this way, the user can quickly judge whether the interactive device for the internet radio station has been connected to the network radio station by observing the network radio station indication LED 5.

Embodiment 2

The difference between the interactive device for an internet radio station provided by the embodiment and that in the embodiment 1 lies in that the knob 1 is physically connected with the selection module 2 through the contact module 6. In addition, the structure of the indication module 5 is also different.

Figure 8:
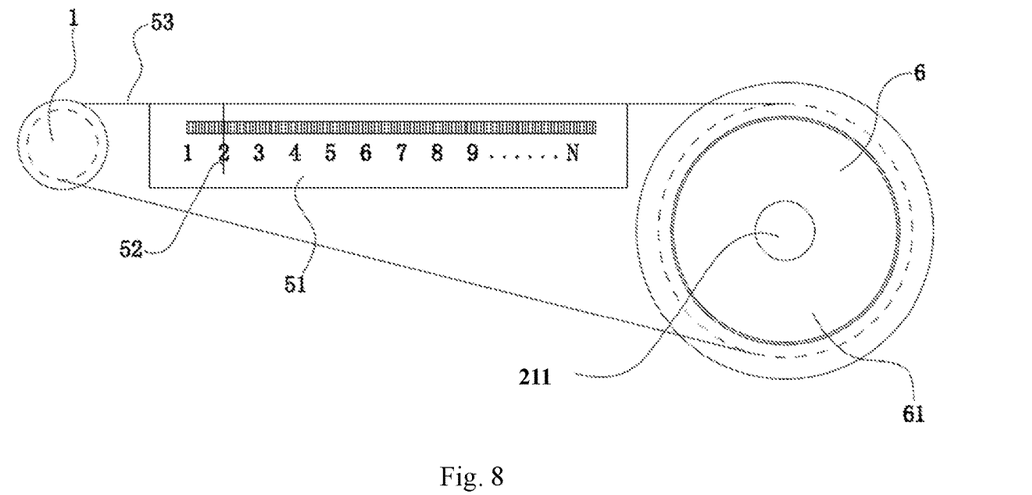
FIG. 8 is a connection diagram between the rotary shaft of the rotary potentiometer, the knob and the contact module according to the second embodiment of the present application.

In this embodiment, referring to FIG. 8, the contact module 6 includes a first pull wire wheel 61 connected with the rotation shaft 211 of the rotary potentiometer 21. The indication module 5 includes a pull wire 53, a dial 51 arranged along the pull wire 53, and a pointer 52 connected with the pull wire 53. The knob 1 and the first pull wire wheel 61 is respectively winded by the pull wire 53. The dial 51 is fixed on the outer side of the shell by screws and is located on the inner side of the pointer 52. In this embodiment, the front side of the shell is provided with a narrow through-hole which is located corresponding to the pull wire 53. The dial 51 is formed on the outer side of the shell, and arranged along the upper or lower edge of the through-hole. A plurality of scale values in the form of Arabic numeral are on the dial 51. The plurality of scale values include "1", "2", "3", "4", "5", "6", "7", "8", "9", . . . and "N". The indication module 5 also includes an LED lamp, which is connected with the processing module 3, and welded on the electronic circuit board 7 at a position aligned with the dial to illuminate the dial.

When the user rotates the knob 1 to input the station selection instruction, the knob 1 pulls the pull wire 53 to walk a certain track and drives the first pull wire wheel 61 to rotate. Then the first pull wire wheel 61 brings the rotation shaft 211 of the rotary potentiometer 21 to rotate, and the channel selection circuit generates an electrical signal corresponding to the channel selection instruction. The processing module 3 is linked to the network radio station through the communication module 4 in advance. When the processing module 3 receives the electrical signal, it obtains the audio resource corresponding to the electrical signal from the network radio station, and sends the audio resource to the content presentation unit. The content presentation unit receives and plays the audio resource. In such a way, the desired audio resource can be selected and listened by using the rotary tuning manner of the analog traditional radio. Meanwhile, the processing module 3 also drives the LED lamp to light up, then the lighted LED lamp can illuminate the dial to make the dial more obvious and easier to be observed by the user.

On the other hand, when the knob 1 is rotated for a certain angle, the pull wire 53 would bring the pointer 52 to move a certain distance along the dial. At this time, the pointer 52 is aligned with a certain scale value of the dial, so that the user can clearly know what kind of audio resources can be listened when the pointer 52 is aligned with the certain scale value on the dial. When the user wants to listen to the same audio resource next time, the user only needs to rotate the knob 1 so that the pointer 52 is aligned with the corresponding scale value. For example, when the pointer 52 is aligned with the scale value labeled "8" on the dial, the content presentation unit plays the audio resources of the humanities and social sciences class. Then, the next time when a user wants to listen to the audio resources of the humanities and social sciences class, he only needs to turn the knob 1 to enable the pointer 52 to align with the scale value labeled "8" on the dial.

Obviously, the interactive device for an internet radio station provided by the implementation of the present embodiment can achieve the same effect as that of the embodiment 1.

Embodiment 3

The difference between the interactive device for an internet radio station provided by the embodiment and that in the embodiment 2 lies in that the contact module 6 is different.

Figure 9:
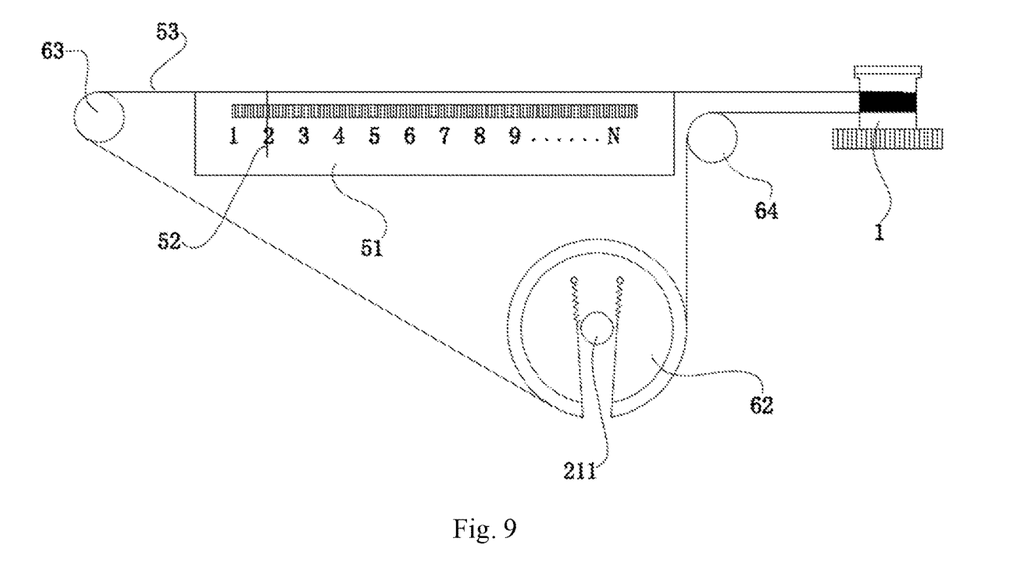
FIG. 9 is a connection diagram between the rotary shaft of the rotary potentiometer, the knob and the contact module according to the third embodiment of the present application.

As shown in FIG. 9, in the present embodiment, the contact module 6 comprises a second pull wire wheel 62 connecting with the rotary shaft 211 of the rotary potentiometer 21, a first passive transmission wheel 63 and a second passive transmission wheel 64. The second pull wire wheel 62, the first passive transmission wheel 63, the second passive transmission wheel 64 and the knob 1 are winded by the pull wire 53, simultaneously. The dial 51 is fixed on the outer side of the shell by screws and is located on the inner side of the pointer 52.

Obviously, when the knob 1 is rotated by the user to input the channel selection instruction, the knob 1 will drive the pull wire 53 to walk a certain track. In such a way, the pull wire 53 will rotate the second pull wire wheel 62 for a certain angle. When the second pull wire wheel 62 rotates, the rotary shaft 211 of the rotary potentiometer 21 is brought by the second pull wire wheel 62 to rotate correspondingly for generating the electrical signal corresponding to the channel selection instruction by the channel selection circuit of the rotary potentiometer 21. Meanwhile, the pointer 52 moves a certain distance along the dial with the pull wire 53.

It should be noted that the pull wire 53 can be horizontal or vertical, and correspondingly, the pointer 52 can be vertical or horizontal.

The implementation of the interactive device for an internet radio station provided by the embodiment is the same as that of the second embodiment, which will not be repeated here.

The foregoing is a further detailed description of the present application in connection with specific preferred embodiments, and cannot be considered as that the specific implementation of the present application is limited to these illustrations. It will be apparent to those skilled in the art that any various modifications or substitutions may be made to the present application without departing from the spirit of the invention, and such modifications or substitutions should be considered as falling within the scope of the present application.

The invention claimed is:

1. An interactive device for an internet radio station comprising a content presentation unit and a content selection unit, wherein the content selection unit comprises a knob, a selection module physically connected with the knob, a processing module electrically connected with the selection module, an indication module of a physical shape physically connected with the knob, and a communication module electrically connected with the processing module; wherein, the knob is configured to input, by a user, a channel selection instruction by means of manual rotation; the selection module is configured to generate a corresponding electrical signal according to the channel selection instruction; the processing module is linked to a network radio station by the communication module, and configured to obtain, according to the electrical signal, a corresponding audio resource from the network radio station and release the corresponding audio resource to the content presentation unit; the content presentation unit is configured to play the audio resource; and the indication module is configured to generate, under a driving of the knob, a state change corresponding to the channel selection instruction; wherein the indication module comprises a pull wire, a pointer connected with the pull wire, and a dial arranged along the pull wire; wherein the dial comprises a plurality of scale values corresponding to a plurality of different audio resources one by one, a contact module comprises a first pull wire wheel connecting with a rotary shaft of a rotary potentiometer, wherein the first pull wire wheel and the knob are winded by the pull wire.

2. The interactive device for an internet radio station according to claim 1, wherein the selection module comprises a rotary potentiometer, the knob is directly sheathed on a rotary shaft of the rotary potentiometer; wherein when the knob is rotated by the user to input the channel selection instruction, the rotary shaft of the rotary potentiometer is configured to generate the electrical signal corresponding to the channel selection instruction with the rotation of the knob.

3. The interactive device for an internet radio station according to claim 2, wherein the indication module comprises a dial around the knob and a pointer connected to the knob; wherein when the knob is rotated by the user to input the channel selection instruction, the pointer is configured to rotate along the dial with the knob.

4. The interactive device for an internet radio station according to claim 3, wherein the indication module further comprises a light-emitting element connected with the processing module, wherein the light-emitting element is arranged correspondingly to the dial for illuminating the dial.

5. The interactive device for an internet radio station according to claim 4, wherein further comprises a shell and an electronic circuit board arranged in the shell, the processing module and the communication module are integrated on the electronic circuit board, and the rotary potentiometer is welded on the electronic circuit board.

6. The interactive device for an internet radio station according to claim 5, wherein the light-emitting element is welded on the electronic circuit board.

7. The interactive device for an internet radio station according to claim 1, wherein the selection module comprises a rotary potentiometer, wherein the knob is physically connected with a rotary shaft of the rotary potentiometer through a contact module; wherein when the knob is rotated by the user to input the channel selection instruction, the knob is configured to bring the rotary shaft of the rotary potentiometer to rotate through the contact module, such that the rotary potentiometer is configured to generate the electrical signal corresponding to the channel selection instruction.

8. The interactive device for an internet radio station according to claim 7, wherein when the knob is rotated by the user to input the channel selection instruction, the knob is configured to drive the pull wire to walk a certain track, so that the first pull wire wheel is configured to bring the rotary shaft of the rotary potentiometer to rotate correspondingly for generating the electrical signal corresponding to the channel selection instruction; wherein the processing module is configured to obtain, according to the electrical signal, a corresponding audio resource from the network radio station and release the corresponding audio resource to the content presentation unit; the content presentation unit is configured to play the audio resource; the pointer is configured to move along the dial with the pull wire and align with the scale value corresponding to the audio resource.

9. The interactive device for an internet radio station according to claim 8, wherein the indication module further comprises a light-emitting element connected with the processing module, wherein the light-emitting element is arranged correspondingly to the dial for illuminating the dial.

10. The interactive device for an internet radio station according to claim 9, wherein further comprises a shell and an electronic circuit board arranged in the shell, the processing module and the communication module are integrated on the electronic circuit board, and the rotary potentiometer is welded on the electronic circuit board.

11. The interactive device for an internet radio station according to claim 10, wherein the light-emitting element is welded on the electronic circuit board.

12. The interactive device for an internet radio station according to claim 7, wherein the indication module comprises a pull wire, a pointer connected with the pull wire, and a dial arranged along the pull wire; wherein the dial comprises a plurality of scale values corresponding to a plurality of different audio resources one by one, the contact module comprises a second pull wire wheel connecting with the rotary shaft of the rotary potentiometer, a first passive transmission wheel and a second passive transmission wheel; wherein the second pull wire wheel, the first passive transmission wheel, the second passive transmission wheel and the knob are winded by the pull wire simultaneously; wherein when the knob is rotated by the user to input the channel selection instruction, the knob is configured to drive the pull wire to walk a certain track, so that the second pull wire wheel is configured to bring the rotary shaft of the rotary potentiometer to rotate correspondingly for generating the electrical signal corresponding to the channel selection instruction; wherein the processing module is configured to obtain, according to the electrical signal, a corresponding audio resource from the network radio station and release the corresponding audio resource to the content presentation unit; the content presentation unit is configured to play the audio resource; the pointer is configured to move along the dial with the pull wire and align with the scale value corresponding to the audio resource.

13. The interactive device for an internet radio station according to claim 12, wherein the indication module further comprises a light-emitting element connected with the processing module, wherein the light-emitting element is arranged correspondingly to the dial for illuminating the dial.

14. The interactive device for an internet radio station according to claim 13, wherein further comprises a shell and an electronic circuit board arranged in the shell, the processing module and the communication module are integrated on the electronic circuit board, and the rotary potentiometer is welded on the electronic circuit board.

15. The interactive device for an internet radio station according to claim 14, wherein the light-emitting element is welded on the electronic circuit board.

16. The interactive device for an internet radio station according to claim 7, wherein the indication module further comprises a light-emitting element connected with the processing module, wherein the light-emitting element is arranged correspondingly to the dial for illuminating the dial.

17. The interactive device for an internet radio station according to claim 16, wherein further comprises a shell and an electronic circuit board arranged in the shell, the processing module and the communication module are integrated on the electronic circuit board, and the rotary potentiometer is welded on the electronic circuit board.

18. The interactive device for an internet radio station according to claim 17, wherein the light-emitting element is welded on the electronic circuit board.

* * * * *